(12) United States Patent
Andersen et al.

(10) Patent No.: US 10,442,733 B2
(45) Date of Patent: Oct. 15, 2019

(54) LIGHTWEIGHT THERMAL INSULATING CEMENT BASED MATERIALS

(71) Applicants: The Intellectual Gorilla GmbH, Entlebuck (CH); Evan R. Daniels, Dallas, TX (US)

(72) Inventors: Per Just Andersen, Dorfen (DE); Evan R. Daniels, Dallas, TX (US)

(73) Assignee: The Intellectual Gorilla GmbH, Sempach Station (CH)

( * ) Notice: Subject to any disclaimer, the term of this patent is extended or adjusted under 35 U.S.C. 154(b) by 0 days.

(21) Appl. No.: 15/116,763

(22) PCT Filed: Feb. 4, 2015

(86) PCT No.: PCT/US2015/014360
§ 371 (c)(1),
(2) Date: Aug. 4, 2016

(87) PCT Pub. No.: WO2015/119987
PCT Pub. Date: Aug. 13, 2015

(65) Prior Publication Data
US 2016/0347662 A1 Dec. 1, 2016

Related U.S. Application Data

(60) Provisional application No. 61/935,393, filed on Feb. 4, 2014, provisional application No. 62/001,753, filed on May 22, 2014.

(51) Int. Cl.
| | | |
|---|---|---|
| *B28B 11/04* | (2006.01) | |
| *C04B 18/24* | (2006.01) | |
| *C04B 20/00* | (2006.01) | |
| *C04B 22/04* | (2006.01) | |
| *C04B 24/24* | (2006.01) | |
| *C04B 28/00* | (2006.01) | |
| *C04B 28/04* | (2006.01) | |
| *C04B 28/06* | (2006.01) | |
| *C04B 28/32* | (2006.01) | |
| *C04B 28/34* | (2006.01) | |
| *B28B 1/50* | (2006.01) | |
| *B28B 11/08* | (2006.01) | |
| *B28B 11/12* | (2006.01) | |
| *C04B 24/38* | (2006.01) | |
| *E04B 1/80* | (2006.01) | |
| *C04B 111/28* | (2006.01) | |
| *C04B 111/40* | (2006.01) | |

(52) U.S. Cl.
CPC .............. *C04B 28/04* (2013.01); *B28B 1/50* (2013.01); *B28B 11/048* (2013.01); *B28B 11/08* (2013.01); *B28B 11/12* (2013.01); *C04B 20/0048* (2013.01); *C04B 22/04* (2013.01); *C04B 24/24* (2013.01); *C04B 24/38* (2013.01); *C04B 24/383* (2013.01); *C04B 28/006* (2013.01); *C04B 28/06* (2013.01); *C04B 28/065* (2013.01); *C04B 28/32* (2013.01); *C04B 28/34* (2013.01); *E04B 1/80* (2013.01); *C04B 2111/28* (2013.01); *C04B 2111/40* (2013.01); *C04B 2201/30* (2013.01); *C04B 2201/32* (2013.01); *Y02P 40/165* (2015.11); *Y02W 30/97* (2015.05)

(58) Field of Classification Search
CPC ......... C04B 28/04; C04B 28/06; C04B 28/34; C04B 28/006; C04B 28/32; C04B 28/065; C04B 18/24; C04B 22/143; C04B 22/04; C04B 24/383; C04B 24/24; C04B 38/02; C04B 20/32; C04B 20/0048; C04B 2111/28; C04B 2111/40; C04B 2201/30; C04B 2201/32; B28B 11/12; B28B 11/08; B28B 11/048; B28B 1/50; E04B 1/80
See application file for complete search history.

(56) References Cited

U.S. PATENT DOCUMENTS

| | | |
|---|---|---|
| 570,391 A | 10/1896 | Fox |
| 1,048,923 A | 12/1912 | Wheeler |
| 3,517,468 A | 6/1970 | Woods |
| 3,852,083 A | 12/1974 | Yang |
| 3,908,062 A | 9/1975 | Roberts |
| 3,987,600 A | 10/1976 | Baehr |
| 3,994,110 A | 11/1976 | Ropella |
| 4,014,149 A | 3/1977 | Yamamoto |
| 4,045,937 A | 9/1977 | Stucky |
| 4,075,804 A | 2/1978 | Zimmerman |
| 4,084,571 A | 4/1978 | McFarland |
| 4,159,302 A | 6/1979 | Greve et al. |

(Continued)

FOREIGN PATENT DOCUMENTS

| | | |
|---|---|---|
| CA | 2799983 A1 | 12/2012 |
| CN | 101113077 | 1/2008 |

(Continued)

OTHER PUBLICATIONS

EP 14759514.4 Extended European Search Report dated Sep. 23, 2016.

(Continued)

*Primary Examiner* — Anthony J Green

(74) *Attorney, Agent, or Firm* — Daniel J. Chalker; Edwin S. Flores; Chalker Flores, LLP

(57) ABSTRACT

A lightweight thermal insulating cement-based material is formed from a mixture that includes cement, water and a foaming agent. The foaming agent can be an aluminum powder or a surfactant. The insulating material has a maximum use temperature of about 900 degrees Celsius or more.

28 Claims, No Drawings

(56) References Cited

U.S. PATENT DOCUMENTS

| | | |
|---|---|---|
| 4,171,985 A | 10/1979 | Motoki |
| 4,225,247 A | 9/1980 | Hodson |
| 4,225,357 A | 9/1980 | Hodson |
| 4,284,119 A | 8/1981 | Martin et al. |
| 4,302,127 A | 11/1981 | Hodson |
| 4,308,065 A | 12/1981 | Walls-Muycelo |
| 4,339,487 A | 7/1982 | Mullet |
| 4,343,127 A | 8/1982 | Greve et al. |
| 4,347,653 A | 9/1982 | Martin et al. |
| 4,398,842 A | 8/1983 | Hodson |
| 4,428,775 A | 1/1984 | Johnson et al. |
| 4,434,899 A | 3/1984 | Rivkin |
| 4,443,992 A | 4/1984 | Shechter |
| 4,489,121 A | 12/1984 | Luckanuck |
| 4,552,463 A | 11/1985 | Hodson |
| 4,660,338 A | 4/1987 | Wagner |
| 4,664,707 A | 5/1987 | Wilson et al. |
| 4,695,494 A | 9/1987 | Fowler et al. |
| 4,704,834 A | 11/1987 | Turner |
| 4,716,700 A | 1/1988 | Hagemeyer |
| 4,716,702 A | 1/1988 | Dickson |
| 4,800,538 A | 1/1989 | Passmore et al. |
| 4,811,538 A | 3/1989 | Lehnert et al. |
| 4,864,789 A | 9/1989 | Thorn |
| 4,889,428 A | 12/1989 | Hodson |
| 4,896,471 A | 1/1990 | Turner |
| 4,922,674 A | 5/1990 | Thorn |
| 4,944,595 A | 7/1990 | Hodson |
| 4,946,504 A | 8/1990 | Hodson |
| 4,998,598 A | 3/1991 | Mardian et al. |
| 5,061,319 A | 10/1991 | Hodson |
| 5,066,080 A | 11/1991 | Woodward |
| 5,074,087 A | 12/1991 | Green |
| 5,100,586 A | 3/1992 | Jennings et al. |
| 5,108,677 A | 4/1992 | Ayres |
| 5,154,358 A | 10/1992 | Hartle |
| 5,169,566 A | 12/1992 | Stucky et al. |
| 5,232,496 A | 8/1993 | Jennings et al. |
| 5,239,799 A | 8/1993 | Bies et al. |
| 5,242,078 A | 9/1993 | Haas et al. |
| 5,250,578 A | 10/1993 | Cornwell |
| 5,305,577 A | 4/1994 | Richards et al. |
| 5,311,381 A | 5/1994 | Lee |
| 5,317,119 A | 5/1994 | Ayres |
| 5,339,522 A | 8/1994 | Paquin et al. |
| 5,344,490 A | 9/1994 | Roosen et al. |
| 5,347,780 A | 9/1994 | Richards et al. |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,395,571 A | 3/1995 | Symons |
| 5,401,588 A | 3/1995 | Garvey et al. |
| 5,417,024 A | 5/1995 | San Paolo |
| 5,433,189 A | 7/1995 | Bales et al. |
| 5,440,843 A | 8/1995 | Langenhorst |
| 5,453,310 A | 9/1995 | Andersen et al. |
| 5,482,551 A | 1/1996 | Morris et al. |
| 5,505,987 A | 4/1996 | Jennings et al. |
| 5,506,046 A | 4/1996 | Andersen et al. |
| 5,508,072 A | 4/1996 | Andersen et al. |
| 5,514,430 A | 5/1996 | Andersen et al. |
| 5,522,195 A | 6/1996 | Bargen |
| 5,527,387 A | 6/1996 | Andersen et al. |
| 5,540,026 A | 7/1996 | Gartland |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,557,899 A | 9/1996 | Dube et al. |
| 5,569,514 A | 10/1996 | Ayres |
| 5,580,409 A | 12/1996 | Andersen et al. |
| 5,580,624 A | 12/1996 | Andersen et al. |
| 5,582,670 A | 12/1996 | Andersen et al. |
| 5,601,888 A | 2/1997 | Fowler |
| 5,614,307 A | 3/1997 | Andersen et al. |
| 5,618,341 A | 4/1997 | Andersen et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,644,870 A | 7/1997 | Chen |
| 5,653,075 A | 8/1997 | Williamson |
| 5,654,048 A | 8/1997 | Andersen et al. |
| 5,658,603 A | 8/1997 | Andersen et al. |
| 5,658,624 A | 8/1997 | Andersen et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Tiefenbacher et al. |
| 5,714,217 A | 2/1998 | Andersen et al. |
| 5,716,675 A | 2/1998 | Andersen et al. |
| 5,720,142 A | 2/1998 | Morrison |
| 5,720,913 A | 2/1998 | Andersen et al. |
| 5,736,209 A | 4/1998 | Andersen et al. |
| 5,738,921 A | 4/1998 | Andersen et al. |
| 5,740,635 A | 4/1998 | Gil et al. |
| 5,746,822 A | 5/1998 | Espinoza et al. |
| 5,749,178 A | 5/1998 | Garmong |
| 5,753,308 A | 5/1998 | Andersen et al. |
| 5,766,525 A | 6/1998 | Andersen et al. |
| 5,776,388 A | 7/1998 | Andersen et al. |
| 5,782,055 A | 7/1998 | Crittenden |
| 5,783,126 A | 7/1998 | Andersen et al. |
| 5,786,080 A | 7/1998 | Andersen et al. |
| 5,798,010 A | 8/1998 | Richards et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,849,155 A | 12/1998 | Gasland |
| 5,851,634 A | 12/1998 | Andersen et al. |
| 5,868,824 A | 2/1999 | Andersen et al. |
| 5,871,677 A | 2/1999 | Falke et al. |
| 5,879,722 A | 3/1999 | Andersen et al. |
| 5,887,402 A | 3/1999 | Ruggie et al. |
| 5,916,077 A | 6/1999 | Tang |
| 5,928,741 A | 7/1999 | Andersen et al. |
| 5,976,235 A | 11/1999 | Andersen et al. |
| 6,030,673 A | 2/2000 | Andersen et al. |
| 6,067,699 A | 5/2000 | Jackson |
| 6,083,586 A | 7/2000 | Andersen et al. |
| 6,090,195 A | 7/2000 | Andersen et al. |
| 6,115,976 A | 9/2000 | Gomez |
| 6,119,411 A | 9/2000 | Mateu Gil et al. |
| 6,161,363 A | 12/2000 | Herbst |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,231,970 B1 | 5/2001 | Andersen et al. |

(56) References Cited

U.S. PATENT DOCUMENTS

| | | |
|---|---|---|
| 6,268,022 B1 | 7/2001 | Schlegel et al. |
| 6,299,970 B1 | 10/2001 | Richards et al. |
| 6,311,454 B1 | 11/2001 | Kempel |
| 6,327,821 B1 | 12/2001 | Chang |
| 6,347,934 B1 | 2/2002 | Andersen et al. |
| 6,379,446 B1 | 4/2002 | Andersen et al. |
| 6,402,830 B1 | 6/2002 | Schaffer |
| 6,434,899 B1 | 8/2002 | Fortin et al. |
| 6,475,275 B1 | 11/2002 | Nebesnak et al. |
| 6,485,561 B1 | 11/2002 | Dattel |
| 6,494,704 B1 | 12/2002 | Andersen et al. |
| 6,503,751 B2 | 1/2003 | Hugh |
| 6,528,151 B1 | 3/2003 | Shah et al. |
| 6,572,355 B1 | 6/2003 | Bauman et al. |
| 6,573,340 B1 | 6/2003 | Khemani et al. |
| 6,581,588 B2 | 6/2003 | Wiedemann et al. |
| 6,619,005 B1 | 9/2003 | Chen |
| 6,643,991 B1 | 11/2003 | Moyes |
| 6,665,997 B2 | 12/2003 | Chen |
| 6,668,499 B2 | 12/2003 | Degelsegger |
| 6,684,590 B2 | 2/2004 | Frumkin |
| 6,688,063 B1 | 2/2004 | Lee et al. |
| 6,696,979 B2 | 2/2004 | Manten et al. |
| 6,743,830 B2 | 6/2004 | Soane et al. |
| 6,745,526 B1 | 6/2004 | Autovino |
| 6,764,625 B2 | 7/2004 | Walsh |
| 6,766,621 B2 | 7/2004 | Reppermund |
| 6,773,500 B1 | 8/2004 | Creamer et al. |
| 6,779,859 B2 | 8/2004 | Koons |
| 6,818,055 B2 | 11/2004 | Schelinski |
| 6,843,543 B2 | 1/2005 | Ramesh |
| 6,866,081 B1 | 3/2005 | Nordgard et al. |
| 6,886,306 B2 | 5/2005 | Churchill et al. |
| 6,890,604 B2 | 5/2005 | Daniels |
| 6,961,998 B2 | 11/2005 | Furchheim et al. |
| 6,964,722 B2 | 11/2005 | Taylor et al. |
| 6,981,351 B2 | 1/2006 | Degelsegger |
| 7,059,092 B2 | 6/2006 | Harkin et al. |
| 7,090,897 B2 | 8/2006 | Hardesty |
| RE39,339 E | 10/2006 | Andersen et al. |
| 7,185,468 B2 | 3/2007 | Clark et al. |
| 7,241,832 B2 | 7/2007 | Khemani et al. |
| 7,279,437 B2 | 10/2007 | Kai et al. |
| 7,297,394 B2 | 11/2007 | Khemani et al. |
| 7,386,368 B2 | 6/2008 | Andersen et al. |
| 7,598,460 B2 | 10/2009 | Roberts, IV et al. |
| 7,617,606 B2 | 11/2009 | Robbins et al. |
| 7,669,383 B2 | 3/2010 | Darnell |
| 7,721,500 B2 | 5/2010 | Clark et al. |
| 7,758,955 B2 | 7/2010 | Frey et al. |
| 7,775,013 B2 | 8/2010 | Bartlett et al. |
| 7,803,723 B2 | 9/2010 | Herbert et al. |
| 7,832,166 B2 | 11/2010 | Daniels |
| 7,886,501 B2 | 2/2011 | Bartlett et al. |
| 7,897,235 B1 | 3/2011 | Locher et al. |
| 7,927,420 B2 | 4/2011 | Francis |
| 7,964,051 B2 | 6/2011 | Lynch et al. |
| 8,037,820 B2 | 10/2011 | Daniels |
| 8,097,544 B2 | 1/2012 | Majors |
| 8,209,866 B2 | 7/2012 | Daniels |
| 8,381,381 B2 | 2/2013 | Daniels |
| 8,650,834 B2 | 2/2014 | Hardwick et al. |
| 8,915,033 B2 | 12/2014 | Daniels |
| 9,027,296 B2 | 5/2015 | Daniels |
| 9,475,732 B2 | 10/2016 | Daniels |
| 9,890,083 B2 | 2/2018 | Daniels |
| 2001/0032367 A1 | 10/2001 | Sasage et al. |
| 2001/0047741 A1 | 12/2001 | Gleeson et al. |
| 2002/0053757 A1 | 5/2002 | Andersen et al. |
| 2002/0078659 A1 | 6/2002 | Hunt |
| 2002/0100996 A1 | 8/2002 | Moyes et al. |
| 2002/0124497 A1 | 9/2002 | Fortin et al. |
| 2002/0128352 A1 | 9/2002 | Soane et al. |
| 2002/0166479 A1 | 11/2002 | Jiang |
| 2003/0015124 A1 | 1/2003 | Klus |
| 2003/0033786 A1 | 2/2003 | Yulkowski |
| 2003/0084980 A1 | 5/2003 | Seufert et al. |
| 2003/0115817 A1 | 6/2003 | Blackwell et al. |
| 2003/0205187 A1 | 11/2003 | Carlson et al. |
| 2003/0209403 A1 | 11/2003 | Daniels |
| 2003/0211251 A1 | 11/2003 | Daniels |
| 2003/0211252 A1 | 11/2003 | Daniels |
| 2004/0025465 A1 | 2/2004 | Aldea |
| 2004/0026002 A1 | 2/2004 | Weldon |
| 2004/0231285 A1 | 11/2004 | Hunt et al. |
| 2004/0258901 A1 | 12/2004 | Luckevich |
| 2005/0092237 A1 | 5/2005 | Daniels |
| 2005/0227006 A1 | 10/2005 | Segall |
| 2005/0241541 A1 | 11/2005 | Hohn et al. |
| 2005/0284030 A1 | 12/2005 | Autovino et al. |
| 2006/0070321 A1 | 4/2006 | Au |
| 2006/0096240 A1 | 5/2006 | Fortin |
| 2006/0168906 A1 | 8/2006 | Tonyan et al. |
| 2006/0287773 A1 | 12/2006 | Andersen et al. |
| 2007/0021515 A1 | 1/2007 | Glenn et al. |
| 2007/0077436 A1 | 4/2007 | Naji et al. |
| 2007/0092712 A1 | 4/2007 | Hodson |
| 2007/0095570 A1 | 5/2007 | Roberts, IV et al. |
| 2007/0125043 A1 | 6/2007 | Clark et al. |
| 2007/0125044 A1 | 6/2007 | Clark et al. |
| 2007/0157537 A1 | 7/2007 | Nicolson et al. |
| 2007/0175139 A1 | 8/2007 | Nicolson et al. |
| 2007/0193220 A1 | 8/2007 | Daniels |
| 2007/0283660 A1 | 12/2007 | Blahut |
| 2008/0016820 A1 | 1/2008 | Robbins, Sr. et al. |
| 2008/0027583 A1 | 1/2008 | Andersen et al. |
| 2008/0027584 A1 | 1/2008 | Andersen et al. |
| 2008/0027685 A1 | 1/2008 | Andersen et al. |
| 2008/0041014 A1 | 2/2008 | Lynch et al. |
| 2008/0066653 A1 | 3/2008 | Andersen et al. |
| 2008/0086982 A1 | 4/2008 | Parenteau et al. |
| 2008/0099122 A1 | 5/2008 | Andersen et al. |
| 2008/0145580 A1 | 6/2008 | McAllister et al. |
| 2008/0152945 A1 | 6/2008 | Miller |
| 2008/0156225 A1 | 7/2008 | Bury |
| 2008/0286519 A1 | 11/2008 | Nicolson et al. |
| 2009/0011207 A1 | 1/2009 | Dubey |
| 2009/0151602 A1 | 6/2009 | Francis |
| 2009/0197991 A1 | 8/2009 | Bury |
| 2010/0064943 A1 | 3/2010 | Guevara et al. |
| 2010/0071597 A1 | 3/2010 | Perez-Pena |
| 2010/0095622 A1 | 4/2010 | Niemoller |
| 2010/0136269 A1 | 6/2010 | Andersen et al. |
| 2010/0251632 A1 | 10/2010 | Chen et al. |
| 2010/0252946 A1 | 10/2010 | Stumm |
| 2011/0040401 A1 | 2/2011 | Daniels |
| 2011/0120349 A1 | 5/2011 | Andersen et al. |
| 2011/0131921 A1 | 6/2011 | Chen |
| 2011/0167753 A1 | 7/2011 | Sawyers et al. |
| 2012/0276310 A1 | 1/2012 | Andersen et al. |
| 2012/0164402 A1 | 6/2012 | Murakami |
| 2012/0208003 A1 | 8/2012 | Beard |
| 2013/0008115 A1 | 1/2013 | Bierman |
| 2013/0086858 A1 | 4/2013 | Daniels et al. |
| 2013/0216802 A1 | 8/2013 | Leung et al. |
| 2013/0280518 A1* | 10/2013 | Stahli .................... C04B 28/02 428/312.4 |
| 2014/0000193 A1 | 1/2014 | Daniels et al. |
| 2014/0000194 A1 | 1/2014 | Daniels et al. |
| 2014/0000195 A1 | 1/2014 | Daniels et al. |
| 2014/0000196 A1 | 1/2014 | Daniels et al. |
| 2015/0086769 A1 | 3/2015 | Daniels et al. |
| 2015/0107172 A1 | 4/2015 | Daniels et al. |

FOREIGN PATENT DOCUMENTS

| | | |
|---|---|---|
| CN | 101132999 A | 2/2008 |
| CN | 101239838 | 8/2008 |
| CN | 102001832 A | 11/2010 |
| CN | 102167619 A * | 8/2011 |
| CN | 102220829 | 10/2011 |
| CN | 102643013 | 8/2012 |
| CN | 102712531 A | 10/2012 |
| DE | 10200601544 A1 | 10/2007 |

(56) References Cited

FOREIGN PATENT DOCUMENTS

| | | |
|---|---|---|
| EP | 1266877 A2 | 12/2002 |
| EP | 2189612 A2 | 5/2010 |
| EP | 2230075 A1 | 9/2010 |
| EP | 2314462 A1 | 4/2011 |
| EP | 2583954 A1 | 4/2013 |
| GB | 1265471 A | 3/1972 |
| GB | 1508866 | 4/1978 |
| JP | 05-052075 | 3/1993 |
| JP | H05-097487 | 4/1993 |
| JP | H06-56497 A | 3/1994 |
| JP | H11-147777 | 6/1999 |
| JP | 2004332401 | 11/2004 |
| JP | 2008036549 A | 2/2008 |
| JP | 2008201613 | 9/2008 |
| RU | 2132829 C1 | 7/1999 |
| RU | 2411218 C1 * | 1/2010 |
| WO | 199105744 A1 | 5/1991 |
| WO | 2002031306 A1 | 4/2002 |
| WO | 2003004432 A1 | 1/2003 |
| WO | 2005105700 A1 | 11/2005 |
| WO | 2006138732 | 12/2006 |
| WO | 2007051093 | 5/2007 |
| WO | 2007053852 A2 | 5/2007 |
| WO | 2008144186 A1 | 11/2008 |
| WO | 2009038621 A1 | 3/2009 |
| WO | 2010141032 A1 | 12/2010 |
| WO | 2011066192 A1 | 6/2011 |
| WO | 2012084716 A1 | 6/2012 |
| WO | 2013082524 A1 | 6/2013 |

OTHER PUBLICATIONS

Extended Search Report EP 13845068 dated Oct. 16, 2016.
Kralj, D., "Experimental study of recycling lightweight concrete with aggregates containing expanded glass." Process Safety and Environmental Protection, vol. 87, No. 4, Jul. 1, 2809 (Jul. 1, 2009), pp. 267-273.
European Extended Search Report for EP 14854429.9 dated Jun. 1, 2017.
International Search Report (KIPO) PCT/US2013/048642 dated Sep. 2, 2013.
International Search Report (KIPO) PCT/US2013/048712 dated Sep. 10, 2013.
International Search Report [KIPO] PCT/US2014/035313 dated Aug. 19, 2014.
International Search Report [KIPO] PCT/US2014/035277 dated Sep. 2, 2014.
Search Report PCT/US07/04605, dated Oct. 4, 2007.
Search Report PCT US12/059053 dated Mar. 12, 2013.
Supplementary European Search Report for EP 15803724 dated Jan. 23, 2018.
XP 000375896 6001 Chemical Abstracts 117 Aug. 24, 1992, No. 8, Columbus, Ohio, US.
Office Action [EP 13809252.3] dated Sep. 3, 2018.
Office Action [EP 14788791.3] dated Jan. 8, 2019.

* cited by examiner

LIGHTWEIGHT THERMAL INSULATING CEMENT BASED MATERIALS

CROSS REFERENCE TO RELATED APPLICATIONS

This application claims priority to, and is a National Phase of International Application No. PCT/US2015/014360, filed on Feb. 4, 2015, which claims the benefit under 35 U.S.C. § 119(e) of U.S. Provisional Application Nos. 61/935,393 filed Feb. 4, 2014 and 62/001,753 filed May 22, 2014. The contents of the foregoing applications are hereby incorporated by reference in their entirety.

FIELD OF INVENTION

The present invention relates generally to the field of composite materials and, more particularly, to lightweight thermal insulating cement based materials.

BACKGROUND ART

None.

SUMMARY OF THE INVENTION

The present invention provides a lightweight thermal insulating cement-based material ("insulating material") formed from a mixture that includes cement, water and a foaming agent. The foaming agent can be an aluminum powder or a surfactant. The insulating material has a maximum use temperature of about 900 degrees Celsius or more.

In addition, the present invention provides an insulating material formed from a mixture that includes cement in an amount of about 25 to 90% of weight wet, water in an amount of about 10 to 70% of weight wet, and a foaming agent. The foaming agent can be an aluminum powder in an amount of about 0.5 to 3.0% by weight of the cement or a surfactant in an amount of about 0.05 to 4.0% by weight of the water. The insulating material has a maximum use temperature of about 900 degrees Celsius or more, a density in the range of about 0.05 to 1.0 g/cm3, a thermal conductivity in the range of about 0.02 to 1.0 W/(m·K), a compressive strength in the range of about 10 to 3000 PSI, and a flexural strength in the range of about 10 to 3000 PSI.

Moreover, the present invention provides a method for manufacturing an insulating material by mixing a cement with water, foaming the cement-water mixture using a foaming agent, pouring the foamed cement-water mixture into a mold and allowing the foamed cement-water mixture to rise to form the insulating material, removing the insulating material from the mold and curing the insulating material. The insulating material has a maximum use temperature of about 900 degrees Celsius or more.

Furthermore, the present invention provides a method for manufacturing an insulating material by mixing a cement in an amount of about 25 to 90% of weight wet with water in an amount of about 10 to 70% of weight wet, foaming the cement-water mixture using a foaming agent (an aluminum powder in an amount of about 0.5 to 3.0% by weight of the cement or a surfactant in an amount of about 0.05 to 4.0% by weight of the water), pouring the foamed cement-water mixture into a mold and allowing the foamed cement-water mixture to rise to form the insulating material, removing the insulating material from the mold and curing the insulating material. The insulating material has a maximum use temperature of about 900 degrees Celsius or more, a density in the range of about 0.05 to 1.0 $g/cm^3$, a thermal conductivity in the range of about 0.02 to 1.0 W/(m·K), a compressive strength in the range of about 10 to 3000 PSI, and a flexural strength in the range of about 10 to 3000 PSI.

BRIEF DESCRIPTION OF THE DRAWINGS

The above and further advantages of the invention may be better understood by referring to the following description in conjunction with the accompanying drawings, in which:
None.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Ordinary Portland cement (OPC), calcium aluminate cement (CAC), Sorel cement (magnesium oxide and magnesium chloride cements), CSA cement (calcium sulphate aluminate cement), phosphate cement, geo-polymer cement or other cement type known in the State-of-the-Art, in its wet state with water added before setting, can be foamed up with reacting aluminum powder or the use of a surfactant. The more the wet material is foamed by adding higher amounts of aluminum or surfactant, the lighter weight and lower density it will be and as a result the more insulating the set and dried material will be. Following setting and drying, when based on OPC, the insulating material can be used below freezing, minimum −273 degrees Celsius, or have a maximum use temperature up to approximately 900 degrees Celsius, and when based on CAC, Sorel cement, CSA cement, phosphate cement, geo-polymer cement or other cement types, the insulating material will have a maximum use temperature up to approximately 1800 degrees Celsius.

The cementitious binder can be used in combination with a multitude of additive materials such as sand, gypsum, silica fume, fumed silica, plaster of Paris, fly ash, slag, rock, glass fiber, plastic fiber, etc. Moreover, the insulating material can be strengthened by adding a strength increasing admixture, such as fumed silica (e.g., Cab-O-Sil EH-5 or similar by Cabot Corporation).

To make the foamed cement-water mixture, the water to cement ratio by weight is typically in the range of about 0.2 to 2.0. When foaming mixtures with lower water to cement ratios in the range of about 0.2 to 1.0 these are as an option made more fluid by adding a conventional plasticizer or high range water reducer (HRWR) in an amount of 0.25 to 4.0% of the cement weight.

As one embodiment, the cement-water-based foam is sometimes stabilized by the addition of a rheology modifying agent. The rheology modifying agent will typically be added in an amount of 0.1 to 5% of the cement weight.

The rheology-modifying agents fall into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch based materials and derivatives thereof, and (c) other polysaccharides.

Suitable cellulose-based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc.

Suitable starch based materials include, for example, wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, and dialdehyde starches.

The currently preferred rheology-modifying agent is hydroxypropylmethylcellulose, examples of which are Methocel 240 and Methocel 240S.

When using aluminum as a foaming agent, the aluminum is typically in a particle size below 100 microns. The aluminum can be added as a dry powder, or as a paste in a mixture with water or diethyleneglycol and for some applications can also be used in a retarded version. The preferred aluminum is purchased from the company Eckart (a German company). Typically, the aluminum is added in an amount of about 0.05 to 3% by weight of the cement weight. When foaming OPC cement based mixes, the water and cement are typically mixed first for about 1 to 5 minutes where after the aluminum is added and mixed for about 5 seconds to 1 minute. When foaming CAC cement based mixes and most other cement types, the water, cement and rheology modifying agent are typically mixed first for about 1 to 5 minutes, where after calcium oxide, calcium hydroxide, sodium hydroxide or similar pH increasing agent is added in an amount of about 0.5 to 10% of the water weight and mixed for about 5 seconds to 1 minute, and finally the aluminum is added and mixed for about 5 seconds to 1 minute.

When using surfactant as a foaming agent, it is preferred that the water and rheology modifying agent are mixed first to make a viscous water phase that is then mixed with the cement, fiber, and foaming agent. The typical mixing time is about 1 to 10 minutes depending on the type of mixer. Alternatively, the surfactant can be premixed with 1-90% of the water to prepare a foam that is then added, or the water mixture can be foamed by passing through a venture-type foaming aggregate nozzle (similar to making shaving foam) that is added to the fiber mixture. The rheology modifying agent is used to stabilize the foam stability and also helps in developing a smaller cell structure in the foam.

By adding a reinforcement fiber to the material increased foam stability will be achieved before setting of the cement, which is especially important when making materials with a dry density in the range of about 0.05 to 0.3 g/cm$^3$. Further, the fiber addition has been found to reduce or eliminate material shrinkage and drying shrinkage cracks during the drying phase of the production process, and further provide increased flexural strength and toughness of the dry material. The preferred type of fiber is cellulose (hardwood or softwood), plastic (based on poly vinyl alcohol or acrylic) and glass fiber; cellulose and plastic fiber is primarily used for insulation intended for below freezing or ambient temperatures, whereas glass fiber is primarily used for insulation intended for temperatures above ambient or where fire resistance is required. Also, combinations of fiber types can be applied. The preferred fiber length is from about 1 to 2 mm for the cellulose fiber, about 4 to 10 mm for the plastic fiber and about 6 to 20 mm for the glass fiber. The preferred fiber diameter is about 10 to 40 microns.

Following mixing, the mixture is poured into a mold system, which can be in the shape of a pipe, half-pipe, block, panel, sheet or other desired shape. For example, a large mold box (e.g., 3 to 6 meters long by 1 to 1.5 meters wide by 0.6 to 1.2 meters tall, etc.) can be used. When using aluminum powder as a foaming agent, the mixture is allowed to rise (due to the formation of hydrogen bubbles as the aluminum reacts with the hydroxyl ions) and fill the mold over the next 0.5 to 2 hours.

When using a surfactant as the foaming agent, the surfactant is specially chosen to have a high degree of foam stability and to generate the right bubble size. One such air entraining agent is sold by the company Sika. The surfactant is typically added in an amount of about 0.05 to 4.0% of the weight of water. The water, cement, surfactant and rheology modifying agent are typically mixed for about 1 to 10 minutes to foam up the mixture. Following mixing, the foamed mixture is poured into the mold system and is allowed to set.

Following hardening, the wet material will be de-molded and cut to size, trimmed, etc. For example, a block of the hardened material can be cut into panels, sheets or other desired shapes.

To develop the final 28 days strength of products made from OPC cement, the product is either allowed to sit around for 28 days in a humid environment, or the strength development can be accelerated within 24-48 hours by heating either by its own internal (exothermic) heat development or by steam curing such as is conventional in the State-of-the-Art.

Products made from CAC cement, Sorel cement, CSA cement, phosphate cement, geo-polymer cement or other cement types will achieve its final strength in 24 hours and does not necessarily require additional curing.

After achieving the final strength development, the product is dried to generate the finished lightweight insulating composite.

In one embodiment, the finished product can be made water repellent by spraying the product with water or solvent based silane. Such product, Protectosil BHN, is typically sold by BASF. The finished product can also be sprayed with anti-fungal or anti-microbial coatings. Moreover, the finished product can be painted, stained or textured.

The finished lightweight cement based insulating composite will have a density in the range of about 0.05-1.0 g/cm$^3$, a compressive strength in the range of about 10-3000 PSI, a flexural strength in the range of about 10 to 3000 PSI, and a heat conductance in the range of about 0.02-1.0 W/mK.

The compositional ranges are shown below:

| Material Component | Wt. % Range of Wet |
|---|---|
| Cement: | |
| OPC, CAC, Sorel cement, CSA cement, phosphate cement, geo-polymer cement, etc. | 25 to 90 |
| Water | 10 to 70 |
| Secondary Material (optional): | |
| Sand, rock, fly ash, slag, silica fume, calcium carbonate, gypsum, etc. | 0 to 50 |
| Strength Increasing Admixture (optional) | 0 to 10 |
| Reinforcement Fiber (optional) | 0 to 20 |
| Rheology-Modifying Agent of Cement (optional) | 0 to 4.0 |
| Foaming Agent: | |
| Aluminum Powder of Cement, or | 0.5 to 3.0 |
| Surfactant of Water | 0.05 to 4.0 |

-continued

| Material | |
|---|---|
| Component | Wt. % Range of Wet |
| pH Increasing Agent: | |
| CaO, CaOH$_2$, NaOH or similar material of Water (optional) | 0.5 to 10 |

The cement can be 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89% or 90% by weight or other incremental percentage between.

The water can be 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69% or 70% by weight or other incremental percentage between.

The secondary material can be 0%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight or other incremental percentage between.

The strength increasing admixture can be 0%, 1%, 2%, 3%, 4%, 5%, 6%, 7%, 8%, 9% or 10% by weight or other incremental percentage between.

The reinforcement fiber can be 0%, 1%, 2%, 3%, 4%, 5%, 6%, 7%, 8%, 9%, 10%, 11%, 12%, 13%, 14%, 15%, 16%, 17%, 18%, 19% or 20% by weight or other incremental percentage between.

The rheology modifying agent can be 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9% or 4.0% by weight or other incremental percentage between.

The aluminum powder of cement can be 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9% or 3.0% by weight or other incremental percentage between.

The pH increasing agent can be 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10%, by weight or other incremental percentage between.

The surfactant of water can be 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9% or 4.0% by weight or other incremental percentage between.

As a result, the present invention provides a lightweight thermal insulating cement-based material ("insulating material") formed from a mixture that includes cement, water and a foaming agent. The foaming agent can be an aluminum powder or a surfactant. The OPC-based insulating material has a maximum use temperature of about 900 degrees Celsius. The CAC, Sorel cement, CSA cement, phosphate cement, geo-polymer cement or other cement-based insulating material has a maximum use temperature of about 1800 degrees Celsius.

In addition, the present invention provides an insulating material formed from a mixture that includes cement in an amount of about 25 to 90% of weight wet, water in an amount of about 10 to 70% of weight wet, and a foaming agent. The foaming agent can be an aluminum powder in an amount of about 0.5 to 3.0% by weight of the cement or a surfactant in an amount of about 0.05 to 4.0% by weight of the water. The insulating material has a density in the range of about 0.05 to 1.0 g/cm$^3$, a thermal conductivity in the range of about 0.02 to 1.0 W/(m·K), a compressive strength in the range of about 10 to 3000 PSI, and a flexural strength in the range of about 10 to 3000 PSI.

Moreover, the present invention provides a method for manufacturing an insulating material by mixing a cement with water, foaming the cement-water mixture using a foaming agent, pouring the foamed cement-water mixture into a mold and allowing the foamed cement-water mixture to rise to form the insulating material and removing the insulating material from the mold. The OPC-based insulating material has a maximum use temperature of about 900 degrees Celsius. The CAC, Sorel cement, CSA cement, phosphate cement, geo-polymer cement or other cement-based insulating material has a maximum use temperature of about 1800 degrees Celsius.

Furthermore, the present invention provides a method for manufacturing an insulating material by mixing cement in an amount of about 25 to 90% of weight wet with water in an amount of about 10 to 70% of weight wet, foaming the cement-water mixture using a foaming agent (an aluminum powder in an amount of about 0.5 to 3.0% by weight of the cement or a surfactant in an amount of about 0.05 to 4.0% by weight of the water), pouring the foamed cement-water mixture into a mold and allowing the foamed cement-water mixture to rise to form the insulating material, removing the insulating material from the mold and heat treating the insulating material. The insulating material has a density in the range of about 0.05 to 1.0 g/cm$^3$, a thermal conductivity in the range of about 0.02 to 1.0 W/(m·K), a compressive strength in the range of about 10 to 3000 PSI, and a flexural strength in the range of about 10 to 3000 PSI.

Although preferred embodiments of the present invention have been described in detail, it will be understood by those skilled in the art that various modifications can be made therein without departing from the spirit and scope of the invention as set forth in the appended claims.

What is claimed is:

1. An insulating material formed from a mixture comprising:
   a cement in an amount of about 25 to 90% of weight wet, wherein the cement comprises an Ordinary Portland cement (OPC), a calcium aluminate cement (CAC), a Sorel cement, a CSA cement, a phosphate cement, or a geo-polymer cement;

water in an amount of about 10 to 70% of weight wet;
a foaming agent comprising an aluminum powder in an amount of about 0.5 to 3.0% by weight of the cement or a surfactant in an amount of about 0.05 to 4.0% by weight of the water;
a rheology-modifying agent in an amount of about 0.1 to 4.0% of a weight of the cement and selected from the group consisting of polysaccharides, polysaccharide derivatives, proteins, protein derivatives thereof and synthetic organic materials; and
the insulating material having a maximum use temperature of about 900 degrees Celsius whenever the cement is the Ordinary Portland cement (OPC) and about 1800 degrees Celsius whenever the cement is the calcium aluminate cement (CAC), the Sorel cement, the CSA cement, the phosphate cement, or the geo-polymer cement, a density in the range of about 0.05 to 1.0 g/cm$^3$, a thermal conductivity in the range of about 0.02 to 1.0 W/(m·K), a compressive strength in the range of about 10 to 3000 PSI, and a flexural strength in the range of about 10 to 3000 PSI.

2. The insulating material as recited in claim 1, the insulating material having a minimum use temperature of about −273 degrees Celsius.

3. The insulating material as recited in claim 1, the cement and the water have a water to cement ratio by weight in the range of about 0.2 to 2.0.

4. The insulating material as recited in claim 3, further comprising a conventional high range water reducer in the range of about 0.25 to 4.0% of the cement weight when the water to cement ratio by weight is in the range of about 0.2 to 1.0.

5. The insulating material as recited in claim 1, further comprising an additive material in an amount of about 0.1 to 50% of weight wet and selected from the group consisting of gypsum, silica fume, fumed silica, plaster of Paris, fly ash, slag, rock and fiber.

6. The insulating material as recited in claim 5, the fiber is in an amount of about 0.1 to 20% of weight wet and comprise glass fibers, cellulose fibers polyvinyl alcohol fibers, polypropylene fibers, or a combination thereof.

7. The insulating material as recited in claim 1, further comprising a strength increasing material in an amount of about 0.1 to 10% of weight wet and comprising fumed silica.

8. The insulating material as recited in claim 1, wherein:
the polysaccharides are selected from the group consisting of cellulose-based materials, derivatives of cellulose-based materials, starch-based materials, and derivatives of starch-based materials;
the cellulose-based materials are selected from the group consisting of methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) and hydroxypropoylmethylcelluose (HPMC); and
the starch-based materials are selected from the group consisting of wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches and dialdehyde starches.

9. The insulating material as recited in claim 1, further comprising a pH increasing agent in an amount of about 0.5 to 10% by weight of the water and selected from the group consisting of calcium oxide, calcium hydroxide and sodium hydroxide.

10. A method for manufacturing an insulating material comprising the steps of:
mixing a cement in an amount of about 25 to 90% of weight wet with water in an amount of about 10 to 70% of weight wet and a rheology modifying agent in an amount of about 0.1 to 4.0% of a weight of the cement, wherein the cement comprises an Ordinary Portland cement (OPC), a calcium aluminate cement (CAC), a Sorel cement, a CSA cement, a phosphate cement, or a geo-polymer cement and the rheology modifying agent is selected from the group consisting of polysaccharides, polysaccharide derivatives, proteins, protein derivatives thereof and synthetic organic materials;
foaming the cement-water mixture using a foaming agent comprising an aluminum powder in an amount of about 0.5 to 3.0% by weight of the cement or a surfactant in an amount of about 0.05 to 4.0% by weight of the water;
pouring the foamed cement-water mixture into a mold and allowing the foamed cement-water mixture to rise to form the insulating material;
removing the insulating material from the mold; and
the insulating material having a maximum use temperature of about 900 degrees Celsius whenever the cement is the Ordinary Portland cement (OPC) and about 1800 degrees Celsius whenever the cement is the calcium aluminate cement (CAC), the Sorel cement, the CSA cement, the phosphate cement, or the geo-polymer cement, a density in the range of about 0.05 to 1.0 g/cm$^3$, a thermal conductivity in the range of about 0.02 to 1.0 W/(m·K), a compressive strength in the range of about 10 to 3000 PSI, and a flexural strength in the range of about 10 to 3000 PSI.

11. The method as recited in claim 10, the insulating material having a minimum use temperature of about −273 degrees Celsius.

12. The method as recited in claim 10, wherein the mixing step is performed for about 1 to 5 minutes.

13. The method as recited in claim 10, wherein the cement comprises an Ordinary Portland cement (OPC), the foaming agent comprises the aluminum powder, and the foaming step is performed for about 5 seconds to 1 minute.

14. The method as recited in claim 10, wherein:
the cement comprises a calcium aluminate cement (CAC), a Sorel cement, a CSA cement, phosphate cement, or a geo-polymer cement;
further comprising the step of adding a pH increasing agent in an amount of about 0.5 to 10% by weight of the water to the cement-water-rheology modifying agent mixture and mixing the cement-water-rheology modifying agent-pH increasing agent mixture for about 5 seconds to 1 minute, wherein the pH increasing agent is selected from the group consisting of calcium oxide, calcium hydroxide and sodium hydroxide;
the foaming agent comprises the aluminum powder; and
the foaming step is performed for about 5 seconds to 1 minute.

15. The method as recited in claim 10, wherein:
the polysaccharides are selected from the group consisting of cellulose-based materials, derivatives of cellulose-based materials, starch-based materials, and derivatives of starch-based materials;
the cellulose-based materials are selected from the group consisting of methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC) and hydroxypropoylmethylceluose (HPMC); and the starch-based materials are selected from the group consisting of wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches and dialdehyde starches.

16. The method as recited in claim 10, wherein:

the mixing step comprises the steps of mixing the water with the rheology-modifying agent, and mixing the cement with the water-rheology-modifying agent; and the foaming agent comprises the surfactant.

17. The method as recited in claim 10, further comprising the step of premixing the foaming agent with 1-90% of the water, wherein the foaming agent comprises the surfactant.

18. The method as recited in claim 10, wherein the foaming step is performed using a venturi foaming aggregate nozzle.

19. The method as recited in claim 10, wherein the foamed cement-water mixture is allowed to rise for about 0.5 to 2.0 hours.

20. The method as recited in claim 10, further comprising the step of curing the insulating material by allowing the insulating material to sit for approximately 28 days in a humid environment, or allowing the insulating material to generate internal heat for 24 to 48 hours, or steam curing the insulating material for 24 to 48 hours.

21. The method as recited in claim 10, further comprising the step of drying the insulating material.

22. The method as recited in claim 10, further comprising the step of cutting, trimming, sanding or routing the insulating material into a specified shape, wherein the specified shape comprises a pipe, a half-pipe, a block, a panel or a sheet.

23. The method as recited in claim 10, further comprising the step of spraying the insulating material with a water repellent.

24. The method as recited in claim 10, the mixture having a water to cement ratio by weight in the range of about 0.2 to 2.0.

25. The method as recited in claim 10, the mixture having a water to cement ratio by weight in the range of about 1.0.

26. The method as recited in claim 10, further comprising the step of adding a conventional high range water reducer in the range of about 0.25 to 4.0% of the cement weight when the water to cement ratio by weight is in the range of about 0.2 to 1.0.

27. The method as recited in claim 10, further comprising:

adding an additive material in an amount of about 0.1 to 50% of weight wet and selected from the group consisting of gypsum, silica fume, fumed silica, plaster of Paris, fly ash, slag, rock and fiber; and wherein the fiber is in an amount of about 0.1 to 20% of weight wet and comprises glass fibers, cellulose fibers polyvinyl alcohol fibers, polypropylene fibers, or a combination thereof.

28. The method as recited in claim 10, further comprising the step of adding a strength increasing material in an amount of about 0.1 to 10% of weight wet and comprising fumed silica.

* * * * *